United States Patent
Schäfer

(10) Patent No.: US 11,260,831 B2
(45) Date of Patent: Mar. 1, 2022

(54) WIPER DEVICE FOR SPHERICAL SURFACES

(71) Applicant: SMR Patents S.à.r.l., Luxembourg (LU)

(72) Inventor: Henrik Schäfer, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 281 days.

(21) Appl. No.: 16/463,317

(22) PCT Filed: Nov. 13, 2017

(86) PCT No.: PCT/EP2017/079079
§ 371 (c)(1),
(2) Date: May 22, 2019

(87) PCT Pub. No.: WO2018/095755
PCT Pub. Date: May 31, 2018

(65) Prior Publication Data
US 2020/0062220 A1    Feb. 27, 2020

(30) Foreign Application Priority Data
Nov. 23, 2016    (DE) .......................... 102016122635.1

(51) Int. Cl.
*B60S 1/38*    (2006.01)
*B60S 1/08*    (2006.01)
(Continued)

(52) U.S. Cl.
CPC ............... *B60S 1/38* (2013.01); *B60S 1/0818* (2013.01); *B60S 1/566* (2013.01);
(Continued)

(58) Field of Classification Search
CPC .......... B60S 1/0818; B60S 1/566; B60S 1/02; B60S 1/0411; B60S 1/20; B60S 1/24;
(Continued)

(56) References Cited

U.S. PATENT DOCUMENTS 3,902,218 A    9/1975    Bryant
8,864,392 B2   10/2014   Alexander et al.
(Continued)

FOREIGN PATENT DOCUMENTS

EP    2 792 556 A1    10/2014
WO    WO-2015003705 A1 *    1/2015    .............. B60S 1/566

OTHER PUBLICATIONS

International Search Report dated Jan. 24, 2018 of International Application No. PCT/EP2017/079079.
(Continued)

*Primary Examiner* — Katina N. Henson
(74) *Attorney, Agent, or Firm* — Jones Day

(57) ABSTRACT

A wiper device for a small and curved surface such as a spherical surface of an optical element includes at least one elongate wiper element with two ends, two drive units to which the ends of the wiper element are attached so that the wiper element can be moved on the surface of the optical element using the two drive units, and at least one contacting means for bringing the wiper element into contact with a surface of the optical element, the contacting means shapes the wiper element around at least that part of the surface which is exposed to the environment due to an opening provided by the housing and is to be cleaned.

10 Claims, 1 Drawing Sheet

(51) Int. Cl.
  *B60S 1/56* (2006.01)
  *G02B 27/00* (2006.01)
  *B60S 1/26* (2006.01)

(52) U.S. Cl.
  CPC ............. *G02B 27/0006* (2013.01); *B60S 1/26* (2013.01); *B60S 2001/3824* (2013.01); *B60S 2001/3837* (2013.01)

(58) Field of Classification Search
  CPC ...... B60S 1/26; B60S 1/48; B60S 1/66; B60S 2001/3824; B60S 2001/3837; B60S 1/38; B60S 1/0848; G02B 27/0006
  See application file for complete search history.

(56) References Cited

U.S. PATENT DOCUMENTS

2016/0368462 A1* 12/2016 Herrmann ................ B60S 1/66
2017/0072909 A1*  3/2017 Giraud ................ B60S 1/0814

OTHER PUBLICATIONS

Written Opinion dated Jan. 24, 2018 of International Application No. PCT/EP2017/079079.

* cited by examiner

WIPER DEVICE FOR SPHERICAL SURFACES

CROSS-REFERENCE TO RELATED APPLICATIONS

This application is a National Stage Entry of International Patent Application No. PCT/EP2017/079079, filed Nov. 13, 2017, which claims the benefit of foreign priority to German Patent Application No. DE 10 2016 122 635.1, filed Nov. 23, 2016, each of which is incorporated by reference herein in its entirety for all purposes.

BACKGROUND

1. Field of the Invention

The following description generally relates to a wiper device for a small and curved surface, such as a spherical surface, of an optical element at least partly arranged within a housing which may be provided by or attached to a motor vehicle.

2. Summary of Related Art

Keeping small and highly curved surfaces clean in rainy conditions poses a challenge for automotive applications. Different wiper devices have been proposed for this purpose.

EP 2 792 556 A1 teaches a wiper device for a disc and/or dome-shaped optical element of a motor vehicle. This wiper device includes at least one elongate wiper element, which has two ends each of which is attached to a drive unit such that the wiper element can be moved from a first end position into a second end position on the surface the optical element by means of the two drive units, guiding means for guiding said movement, and at least one contacting means holding the wiping element in contact with the surface of the optical element. The known wiping element preferably includes a rigid wiper body, which includes at least one wiper portion which is formed complementary to the surface of the optical element, and/or an at least bending-resilient body. The known contacting means includes spring means applying a traction force to the wiping element. The known drive units include a shape memory element and apply a linear translational movement to the wiper element.

SUMMARY

In an aspect, contacting means shape the wiper element around at least that part of the surface, which is exposed to the environment due to an opening provided by the housing and is to be cleaned.

It is preferred that the contacting means is determined by a gap between the surface of the optical element and the housing.

Advantages embodiments of the invention are characterized in that the contacting means is provided by the, in particular circular, opening of the housing for the, in particular spherical, optical element and/or an adaptor means arranged within the opening of the housing, with the adaptor means preferably being adapted to the shape of the optical element, in particular the curvature of said part of the surface to be cleaned.

The drive units may each include a linear actuator and guiding means for guiding the movement of the respective linear actuator.

The drive units may be arranged within the housing and/or are connected to a control unit to move the ends of the wiper element with variable and/or independent speeds.

The wiper element can be flexible.

The wiper element may be held tight around said part of the surface and/or can be arranged out of the field of view of the optical element, in particular beneath the optical element, via the drive units, preferably in dependence of the location and/or speeds of the actuators. Beneath the housing is describing a location within the housing which cannot be seen from the outside.

The wiper element can have a length reaching around said part of the surface at the point of its highest protrusion with the two actuators at a parallel position, preferably above and below the center of the spherical surface.

The locations and/or speeds of the actuators may be controlled in dependence of the distance of the two ends of the wiper element. As the two ends of the wiper element can be moved at different speeds and/or with a time offset to avoid a regular linear movement of the wiper element e.g. from a first end position into a second end position on the surface of the optical element, the cleaning efficiency is increased. The control can, in addition or alternatively, depend on the flexibility of the wiper element, the shape of said part of the surface to be cleaned and/or the contacting means, in particular the shape of the adaptor means, to ensure that the whole surface part exposed to the environment and thus to dirt, rain and the like is cleaned.

At least one sensor, in particular for sensing weather and/or dirt conditions, can be connected to the control unit for adjusting the locations and/or speeds of actuators.

In another aspect, a rearview device for a motor vehicle includes at least one wiper device. Such a rearview device can include a camera and/or a mirror.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

DESCRIPTION

Figure 1:
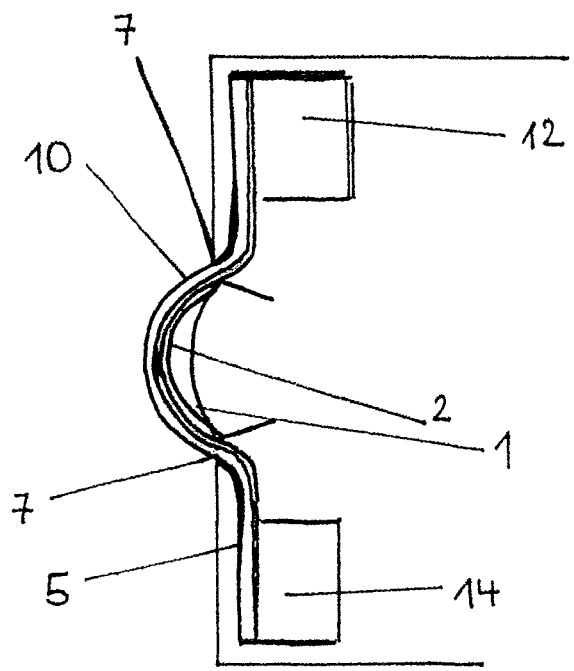
FIG. 1 shows a cross-section of an example of a wiper device in a rearview device of a motor vehicle.

Before explaining at least one example of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

Figure 2:
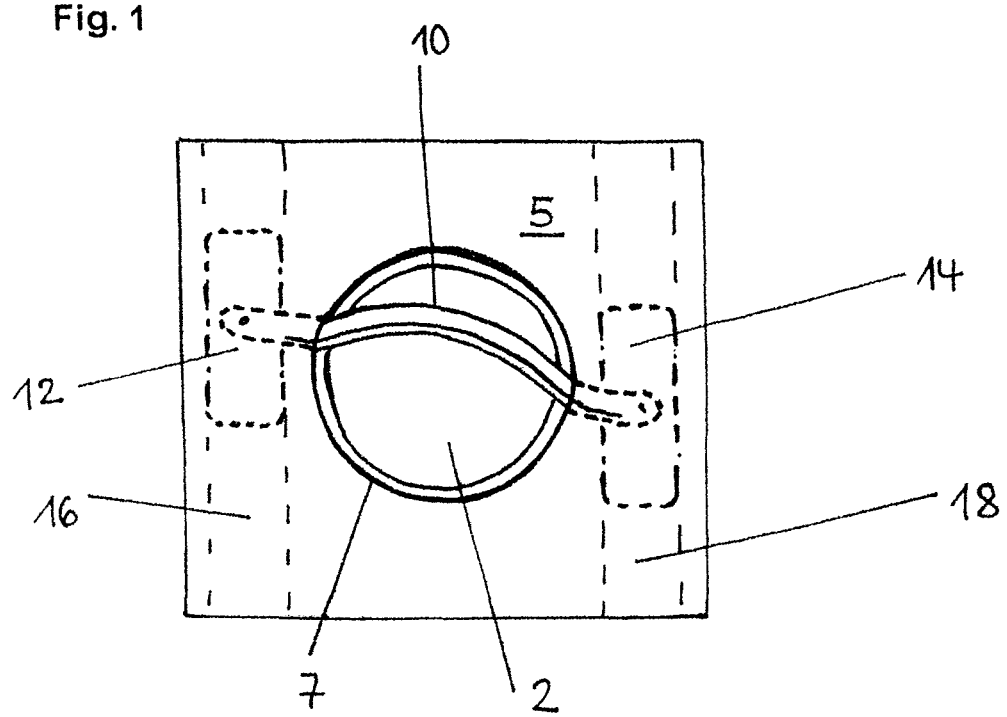
FIG. 2 shows a frontal view of the example of the wiper device of FIG. 1.

Both FIG. 1 and FIG. 2 show an example of a wiper device which is especially suited to be used in cooperation with a front element of a wide angle fish-eye lens as used in rearview devices of motor vehicles. The lens 1 is shown with a part of its spherical surface 2, which provides said front element, projecting above a housing 5 to obtain a rearview. Said part is exposed to the environment and thus dirt, rain and the like such that it has to be cleaned from time to time.

A gap 7 is provided between said surface 2 and said housing 5, as the housing 5 has a circular opening with a diameter being lager than the diameter of the lens 1.

An elongated wiper element 10 in form of a flexible strip with two ends is shown. Each end is fixed to a linear actuator 12, 14, with the actuators 12, 14 being arranged beneath the housing 5 on guiding means 16, 18 in order to act as drive units moving said ends and, thus, the wiper element 10.

Not only the lens 1 extends at least partly through the circular opening of the housing 5, but also the wiper element 10. As the gap 7 is provided between the housing 5 and the lens 1 the wiper element 10 can pass from beneath the housing 5, where it is fixed to the actuators 12, 14, and through said gap 7 in order to be moveably hold on the surface 2. The circular opening of the housing 5 keeps the wiper element 10 on the spherical surface 2 at the outside borders thereof and thus ensures a contact between the wiper element 10 and the spherical surface 2. Without the housing 5 and the gap 7 provided by its opening, the wiper element 10 would be inclined to cut the corners at the outside border. In addition, the housing 5 allows for the wiper element 10 to be recessed completely behind the lens 1 and, thus, out of the field of view of the lens 1, even for a field of view of 180°.

The wiper element 10 is long enough to reach around the curved surface 2 at the point of its highest protrusion with the actuators 12, 14 at a parallel position directly above and below the center of the spherical surface 2, as can be seen in FIG. 2.

To keep the wiper element 10 tight around the curved surface 2 at all areas, the linear actuators 12, 14 are driven with variable independent speeds. It is possible to increase the distance between the two ends of the wiper element 10 and, therefore, increases the tension applied to the flexible wiper element 10.

To further enhance the contact between the wiper element 10 and the curved surface 2 an adaptor means (not shown) can be arranged within the opening of the housing 5. The adaptor means could be adapted to the shape, in particular curvature, of the surface, even allowing to clean non spherical surfaces.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent presently preferred embodiments of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

REFERENCE SIGNS 1 lens
2 spherical surface
5 housing
7 gap
10 wiper element
12 actuator
14 actuator
16 guiding means
18 guiding means

What is claimed is:

1. A wiper device for a small and curved, spherical surface of an optical element which is at least partly arranged within a housing and provided by or attached to a motor vehicle, the wiper device comprising:
 at least one elongate wiper element with two ends;
 two drive units to which the ends of the wiper element are attached so that the wiper element can be moved on the surface of the optical element using the two drive units; and
 at least one contacting means for bringing the wiper element into contact with the surface of the optical element,
 wherein the contacting means shapes the wiper element around a part of the surface which is to be cleaned and is exposed to an outside environment due to an opening provided by the housing, and wherein the drive units are arranged within the housing and connected to a control unit to move the ends of the wiper element with at least one of variable or independent speeds.

2. The wiper device of claim 1, wherein the contacting means is determined by a gap between the surface of the optical element and the housing.

3. The wiper device of claim 1, wherein at least one of the contacting means is circular and provided by the opening of the housing for the spherical optical element;

an adaptor means is arranged within the opening of the housing with the adaptor means being adapted to a shape of the optical element and a curvature of the part of the surface to be cleaned.

4. The wiper device of claim 1, wherein the drive units each comprise a linear actuator and guiding means for guiding movement of the respective linear actuator.

5. The wiper device of claim 1, wherein the wiper element is flexible.

6. The wiper device of claim 1, wherein the wiper element is held tight around the part of the surface or arranged out of a field of view of the optical element and beneath the optical element via the drive units and depending on a location or speeds of the actuators.

7. The wiper device of claim 1, wherein the location or speed of the actuators is controlled using a distance of the two ends of the wiper element, a flexibility of the wiper element, a shape of the part of the surface to be cleaned, or a shape of the contacting means.

8. The wiper device of claim 1, wherein at least one sensor for sensing at least one of weather or dirt conditions is connected to the control unit for adjusting a location or speed of the actuators.

9. A rearview device for a motor vehicle comprising at least one wiper device according to claim 1.

10. The wiper device of claim 4, wherein the wiper element has a length reaching around the part of the surface at a point of highest protrusion with the actuators at a parallel position above and below a center of the spherical surface.

* * * * *